United States Defensive Publication [19] (H) [11] T969,006

Mihari et al. [43] Apr. 4, 1978

[54] SPECTRALLY SENSITIZED SILVER HALIDE PHOTOGRAPHIC EMULSIONS

[76] Inventors: Yuji Mihari; Takeo Sakai; Hideki Ohmatsu; Akira Sato, all of No. 210, Nakanuma, Minami Ashigara-shi, Kanagawa, Japan

[21] Appl. No.: 816,118

[22] Filed: Jul. 15, 1977

[30] Foreign Application Priority Data

Jul. 15, 1976 Japan ..... 51-84859

[51] Int. Cl.[2] ..... G03C 1/14

[52] U.S. Cl. ..... 96/126; 96/94 R

[57] ABSTRACT

An internal latent image type silver halide photographic emulsion which provides a direct positive image by surface development in the presence of a fogging agent and which is useful in a light-sensitive material for the diffusion transfer process, which emulsion is spectrally sensitized with a supersensitizing combination of at least one sensitizing dye represented by the following general formula (I) or (II)

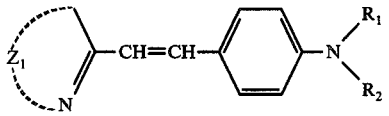

(I)

wherein $Z_1$ represents a non-metallic atomic group necessary to complete a 5- or 6-membered heterocyclic ring; and $R_1$ and $R_2$, which may be the same or different, each represents an alkyl group;

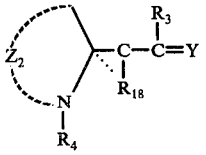

(II)

wherein $Z_2$ represents a non-metallic atomic group necessary to complete a 5- or 6-membered heterocyclic ring; $R_3$ represents an alkyl group or an aryl group; $R_4$ represents an alkyl group or a substituted alkyl group; $R_{18}$ represents a hydrogen atom or an alkylene group necessary to complete a ring when $R_4$ and $R_{18}$ combine to form a ring; and Y represents an oxygen atom or $=N—R_{19}$ wherein $R_{19}$ represents a hydrogen atom, an alkyl group or an aryl group; and at least one sensitizing dye represented by the following general formula (III), (IV), (V), (VI) or (VII)

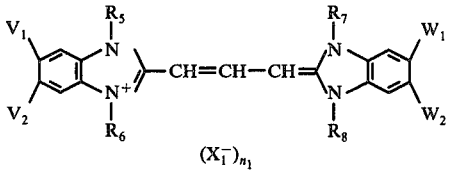

(III)

wherein $V_1$, $V_2$, $W_1$ and $W_2$, which may be the same or different, each represents a hydrogen atom, a halogen atom, a trifluoromethyl group, a cyano group, a carboxy group, an alkoxycarbonyl group, an aminosulfonyl group or an alkylsulfonyl group; $R_5$, $R_6$, $R_7$ and $R_8$, which may be the same or different, each represents an alkyl group or a substituted alkyl group; $X_1$ represents an acid anion; and $n_1$ represents 0 or 1;

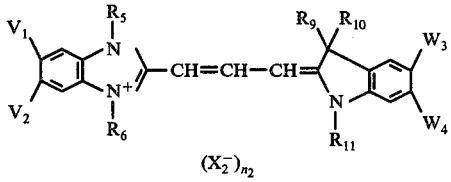

(IV)

wherein $V_1$, $V_2$, $R_5$ and $R_6$, which may be the same or different, each has the same meaning as defined in general formula (III); $R_9$, $R_{10}$ and $R_{11}$, which may be the same or different, each represents an alkyl group or a substituted alkyl group; $X_2$ represents an acid anion; $n_2$ represents 0 or 1; and $W_3$ and $W_4$, which may be the same or different, each represents a hydrogen atom, a halogen atom, an alkyl group, an alkoxy group, a hydroxy group, an acyloxy group or a phenyl group;

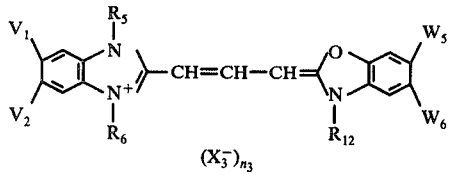

(V)

wherein $V_1$, $V_2$, $R_5$ and $R_6$, which may be the same or different, each has the same meaning as defined in general formula (III); $W_5$ and $W_6$, which may be the same or different, each represents a hydrogen atom, a halogen atom, an alkyl group, an alkoxy group, a hydroxy group, an acyloxy group or a phenyl group; $R_{12}$ represents an alkyl group or a substituted alkyl group; $X_3$ represents an acid anion; and $n_3$ represents 0 or 1;

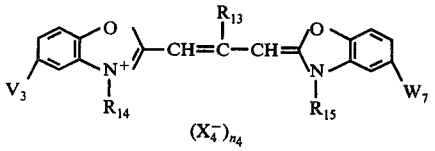

(VI)

wherein $V_3$ and $W_7$, which may be the same or different, each represents a hydrogen atom, an alkyl group, an alkoxy group, a hydroxy group, an acyloxy group or a phenyl group; $R_{13}$ represents an alkyl group; $R_{14}$ and $R_{15}$, which may be the same or different, each represents an alkyl group or a substituted alkyl group; $X_4$ represents an acid anion; and $n_4$ represents 0 or 1;

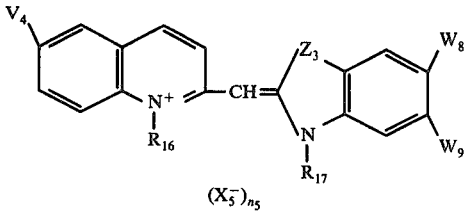

(VII)

wherein $V_4$ represents a hydrogen atom, a halogen atom, an alkyl group, a hydroxy group, an acyloxy group or a phenyl group; $Z_3$ represents an oxygen atom, a sulfur atom, a selenium atom or —CH=CH—; $W_8$ and $W_9$, which may be the same or different, each represents a hydrogen atom, a halogen atom, an alkyl group, an alkoxy group, a hydroxy group or a phenyl group; $R_{16}$ and $R_{17}$, which may be the same or different, each represents an alkyl group or a substituted alkyl group; $X_5$ represents an acid anion; and $n_5$ represents 0 or 1.

10 Claims, 1 Sheet Drawing,

65 Pages Specification

The file of this unexamined application may be inspected and copies thereof may be purchased (849 O.G. 1221, Apr. 9, 1968).

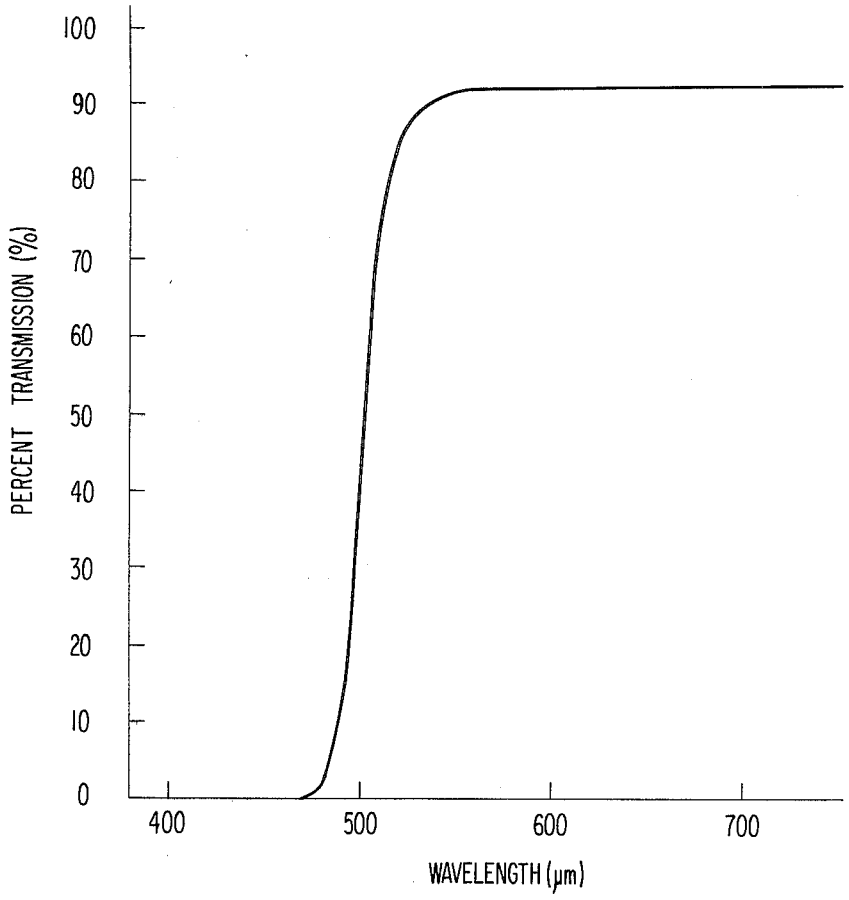
100
90
80
70
60
50
40
30
20
10
0
PERCENT TRANSMISSION (%)
400
500
600
700
WAVELENGTH (μm)